United States Patent [19]

Yamada

[11] Patent Number: 5,748,397
[45] Date of Patent: May 5, 1998

[54] AUDIO SIGNAL PROCESSING APPARATUS AND RECORDING AND/OR REPRODUCING APPARATUS FOR A TAPE-SHAPED RECORDING MEDIUM

[75] Inventor: Eiichi Yamada, Tokyo, Japan

[73] Assignee: Sony Corporation, Tokyo, Japan

[21] Appl. No.: 801,099

[22] Filed: Feb. 14, 1997

Related U.S. Application Data

[63] Continuation of Ser. No. 490,974, Jun. 15, 1995, abandoned.

[30] Foreign Application Priority Data

Jun. 24, 1994 [JP] Japan ........................... 6-164947

[51] Int. Cl.$^6$ ....................................... G11B 5/09
[52] U.S. Cl. ................................. 360/32; 360/51
[58] Field of Search ..................... 360/8, 10.1, 10.2, 360/27, 32, 48, 70, 73.05, 77.17, 72.3, 73.01, 73.06, 25, 51; 386/27, 33, 34, 39, 46, 91, 96, 99, 101, 104

[56] References Cited

U.S. PATENT DOCUMENTS

| | | |
|---|---|---|
| 4,286,294 | 8/1981 | Nakauchi et al. .............. 360/27 |
| 4,985,786 | 1/1991 | Arai et al. ..................... 360/70 |
| 5,218,486 | 6/1993 | Wilkinson ..................... 360/27 |

FOREIGN PATENT DOCUMENTS

| | | | |
|---|---|---|---|
| 137346 | 4/1985 | European Pat. Off. ...... | G11B 15/473 |
| 6236623 | 8/1994 | Japan ........................... | G11B 20/02 |
| 7057349 | 3/1995 | Japan ........................... | G11B 15/467 |

Primary Examiner—Aristotelis M. Psitos
Assistant Examiner—Patrick Wamsley
Attorney, Agent, or Firm—Jay H. Maioli

[57] ABSTRACT

A recording and/or reproducing apparatus for a tape-shaped recording medium to record analog audio signals includes a recording and/or reproducing head, a detecting section, and a compensating section. The head records or reproduces analog signals to or from the tape-shaped recording medium. The detecting section detects any fluctuation in the transporting speed of the tape-shaped recording medium with respect to a rated transporting speed. The compensating section modifies, on the basis of detection results from the detecting section, the analog signals, read out from or to be recorded on the tape-shaped recording medium by the head, so as to compensate for the effect of any fluctuation in the transporting speed of the tape-shaped recording medium with respect to the rated transporting speed before outputting these analog signals or supplying them to the head.

7 Claims, 6 Drawing Sheets

FIG. 2B  A/D INPUT

FIG. 2C  A/D OUTPUT

AUDIO SIGNAL PROCESSING APPARATUS AND RECORDING AND/OR REPRODUCING APPARATUS FOR A TAPE-SHAPED RECORDING MEDIUM

This is a continuation of application Ser. No. 08/490,974 filed Jun. 15, 1995, now abandoned.

BACKGROUND

1. Field of the Invention

The present invention relates to a recording and reproducing apparatus for a tape-shaped recording medium and an audio signal processing apparatus. More particularly, the present invention relates to a recording and/or reproducing apparatus for a tape-shaped recording mediums which is recorded an analog signal and an audio signal processing apparatus.

2. Background of the Invention

There are various types of tape-shaped recording media, for example a compact tape cassette on and a micro tape cassette, which are magnetically recorded analog audio signals.

In recording and/or reproducing apparatuses for a tape-shaped recording media such as the above-mentioned cassettes, various countermeasures have been taken against the deterioration in sound quality (instability in frequency) of the reproduced signals due to fluctuations in the tape speed that is, waw and flotter.

For example, in a tape player using a compact cassette, such fluctuations in tape speed have been restrained by increasing the weight of the flywheel, which is integral with the capstan, to thereby utilize the inertia thereof or providing a servo circuit to cope with the fluctuations in the speed of the capstan-drive motor, effecting a constant rotational speed control on the motor so that it may rotate at a constant rotational speed.

However, none of these above-mentioned conventional systems have been capable of eliminating the wow and the flutter to a sufficient degree.

For example, in the case of a mechanism in which torque is transmitted from the drive motor to the capstan through a belt, the high-frequency fluctuation components cannot be eliminated even by performing the above-mentioned constant rotational speed control on the drive motor with a servo circuit since the mechanism involves a time delay due to the use of the belt.

Further, in cases where the reduction in the size and weight of the tape player is to be further promoted, an increase in the weight of the flywheel would constitute a serious obstacle to such a reduction. Thus, in many cases, these solutions cannot be accepted. Moreover, an increase in the weight of the flywheel is to be considered disadvantageous from the viewpoint of so-called anti-rolling measures, which must be taken for the purpose of preventing irregularities in rotation due to the rolling of the player.

SUMMARY OF THE INVENTION

It is therefore an object of the present invention to provide a recording and/or reproducing apparatus for a tape-shaped recording medium which solves the above-mentioned problem.

It is another object of the present invention to provide an audio signal processing apparatus which resolves the above-mentioned problem.

According to the present invention, there is provided a recording and/or reproducing apparatus for a tape-shaped recording medium, the apparatus including a recording and/or reproducing head, a detecting section, and a compensating section. The recording and/or reproducing head records on and/or reproduces from analog signals on the tape-shaped recording medium. The detecting section detects any fluctuation in the transporting speed of the tape-shaped recording medium with respect to a rated transporting speed. The compensating section modifies analog signals, read from or to be recorded on the tape-shaped recording medium by the head, so as to compensate for any fluctuation in the transporting speed of the tape-shaped recording medium with respect to the rated transporting speed on the basis of detection results from the detecting section before these analog signals are output or supplied to the recording and/or reproducing head.

According to the present invention, there is further provided an audio signal processing apparatus including a clock pulse generating section, an A/D-converting section, a computing section, and a signal generating section. The A/D-converting section converts input analog signals into digital signals in accordance with clock pulses from the clock pulse generating section. The computing section computes any fluctuation in the transporting speed of a tape-shaped recording medium with respect to a reference transporting speed on the basis of the results of the detection of the actual transporting speed of the tape-shaped recording medium. The signal generating section converts the digital signals from the A/D-converting section into analog signals in which any fluctuation in the transporting speed of the tape-shaped recording medium with respect to the reference transporting speed has been compensated for on the basis of detection results from the computing section, and outputs the analog signals thus generated.

In another respect of the present invention, there is provided an audio signal processing apparatus including a computing section, and first and second sample-and-hold sections. The computing section computes any fluctuation in the transporting speed of a tape-shaped recording medium with respect to a reference transporting speed on the basis of the results of the detection of the actual transporting speed of the tape-shaped recording medium. T he firs t sample-and-hold section performs a sample-and-hold operation in a first cycle on inputted analog signals. The second sample-and-hold section performs a sample-and-hold operation in a second cycle on the output from the first sample-and-hold section. The second cycle is produced to compensate the first cycle according to the computing result from the computing section.

In accordance with the present invention, the input/output timing of analog signals is controlled to vary in accordance with the results of the detection of the transporting speed of the tape-shaped recording medium, whereby it is possible to eliminate the wow components and the flutter components due to fluctuations in the transporting speed of the tape-shaped recording medium from the reproducing signals or the signals recorded on the recording medium.

DESCRIPTION OF THE INVENTION

The construction of a recording and/or reproducing apparatus for a tape-shaped recording medium according to the present invention will now be described in detail with reference to the drawings. In the embodiments described below, a magnetic tape that is accommodated in a cassette, such as a compact tape cassette or a micro tape cassette, is adopted as an example of the tape-shaped recording medium.

Figure 1:
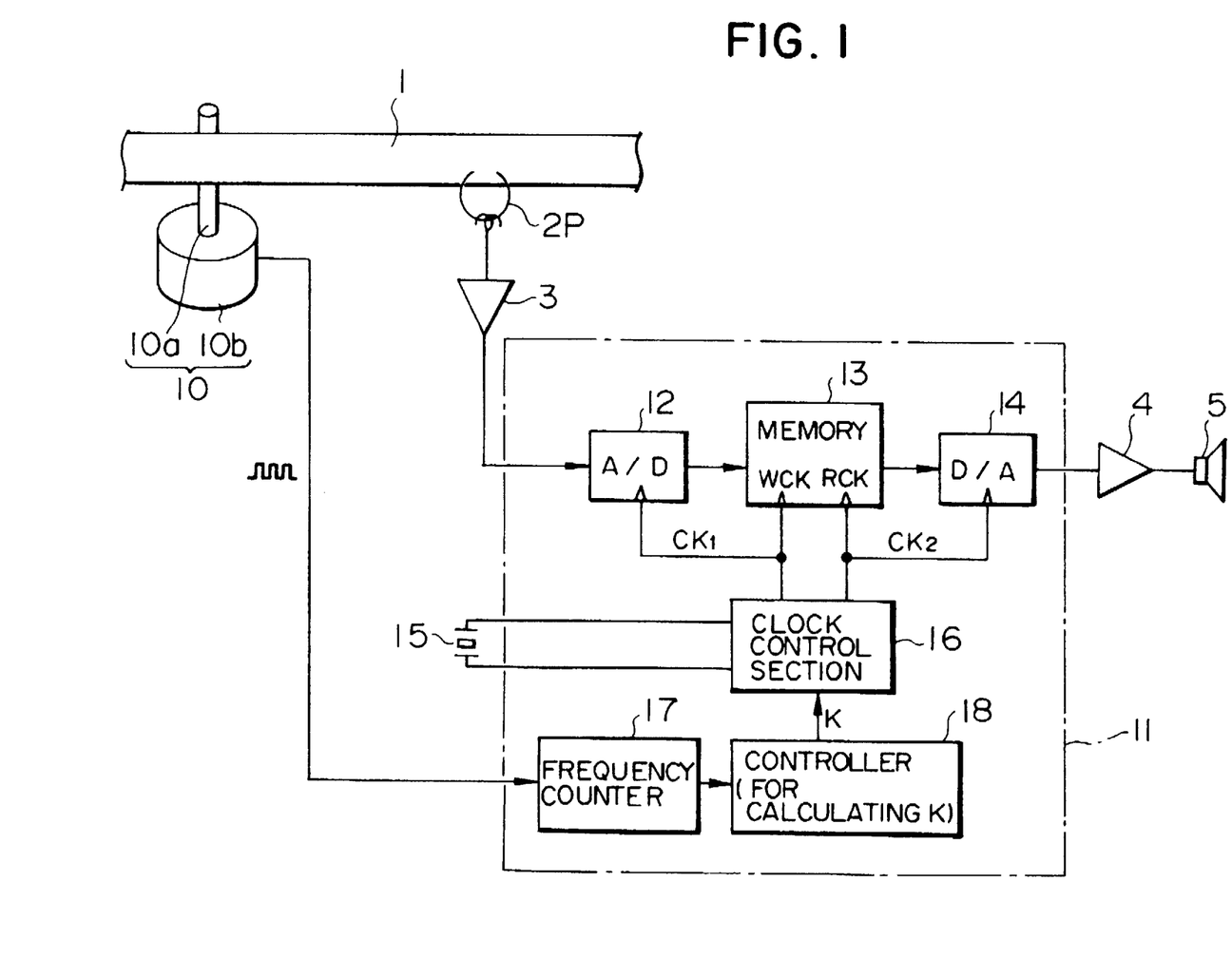
FIG. 1 is a block diagram showing a recording and/or reproducing apparatus according to a first embodiment of the present invention.

FIG. 1 is a block diagram showing an essential part of a recording and/or reproducing apparatus according to a first embodiment of the present invention.

When recording or reproducing, the magnetic tape is transported or traveled at low tape speed in the forward or reverse direction by means of a capstan and pinch roller (not shown) of the recording and/reproducing apparatus.

A reproducing head 2P reads out audio signals from a magnetic tape 1. A reproducing amplifier 3 is supplied the output signal from the reproducing head 2P. The output of the reproducing amplifier 3 is supplied to a digital signal processing section 11, which is composed of a DSP (digital signal processor), and the output of the digital signal processing section 11 is supplied to a power amplifier 4. A speaker unit 5 is supplied the output signals from the power amplifier 4 and converts the output signal from the power amplifier 4 into an audible sound and outputs the audible sound.

A speed detector 10 detects a transporting speed or a traveling speed of the magnetic tape 1 and includes roller 10a and a rotary encoder 10b. The roller 10a is in contact with the magnetic tape 1 and rotated according to transportation of the magnetic tape 1. The rotary encoder 10b detects the rotation of the roller 10a. The rotary encoder 10b outputs pulses in accordance with the rotation of the roller 10a which is rotated by the transportation of the magnetic tape 1. Namely, the rotary encoder 10b outputs a signal that depends on the transporting speed of the magnetic tape 1.

Reference numeral 12 indicates an A/D converter, reference numeral 13 indicates a memory and a reference numeral 14 denotes D/A converter. Analog audio signals output from the reproducing amplifier 3 are converted into digital data by the A/D converter 12, and the digital data are successively stored in the memory 13. Data read out from the memory 13 is converted into analog signals by the D/A converter 14, and the analog signals outputted from the D/A converter 14 are supplied to the power amplifier 4. The analog signals supplied to the power amplifier 4 are amplified by this power amplifier and supplied to the speaker unit 5. The speaker 5 converts the output signals supplied from the power amplifier 4 into an audible sound through electroacoustic conversion before outputting them. The memory 13 is composed of a RAM or the like.

Clock pulses $CK_1$ are used as sampling clock pulses for the A/D converter 12, and as write clock pulses for the memory 13.

Clock pulses $CK_2$ are used as read clock pulses for the memory 13, and as sampling clock pulses for the D/A converter 14.

Reference numeral 15 indicates a clock oscillator, and reference numeral 16 indicates a clock control section. The clock control section 16 divides clock pulses from the clock oscillator 15 and generates the clock pulses $CK_1$ which are fixed frequency clock pulses. The clock pulses $CK_1$ is supplied to the A/D converter 12 and the memory 13. For example, the frequency of the clock pulses $CK_1$ is 100 KHz.

The clock control section 16 also generates clock pulses $CK_2$ and supplies them to the memory 13 and the D/A converter 14. The frequency of the clock pulses $CK_2$ is not a fixed one. As stated below, this frequency is to be varied in accordance with the transporting speed of the magnetic tape 1.

Reference numeral 17 indicates a frequency counter, and reference numeral 18 indicates a controller. The frequency counter 17 is supplied the pulses outputted from the rotary encoder 10b and measures the pulse cycle of the supplied pulses. The controller 18 computes a frequency fluctuation coefficient k from the measured pulse cycle from the frequency counter 17 and a pulse cycle which would be obtained when the magnetic tape 1 is transported or traveled at a rated transporting speed. The frequency fluctuation coefficient k is supplied to the clock control section 16. The controller 18 controls a writing operation of the digital data from the A/D converter 12 and a read-out operation of the stored data of the memory 13. Suppose the pulse cycle that would be obtained as the output of the rotary encoder 10b if the magnetic tape 1 were transporting at a rated speed in a predetermined period of time t, which is between points in time $t_0$ and $t_1$, is $T_0$. Further, suppose the pulse cycle that is actually output from the rotary encoder 10b when the tape 1 is transporting and measured between the same period of time t, i.e., $t_0$ to $t_1$, is $T(t)$.

If $T(t)=T_0$, the magnetic tape 1 is to be considered transporting at the rated speed. In this case, $T(t)/Tp_0=k=1$. In this condition, no fluctuations due to wow and flutter are to be found in the signals reproduced from the magnetic tape 1, nor do the signals recorded on the magnetic tape 1 include any fluctuation component due to wow and flutter.

Next, a case in which there is fluctuation in the tape transporting speed will be considered. In this case, $T(t) \neq T_0$, and if the value of $T(t)/T_0=k$, k indicates a fluctuation with respect to a reference frequency, i.e., the frequency that would be obtained if the tape moved at the rated speed. That is, the value of k represents the ratio of the actual transporting speed of the tape to the rated transporting speed. When $T(t) \neq T_0$, fluctuation components that cause was and flutter are included in the signals reproduced from or recorded on the magnetic tape 1.

Here, by way of example, the case in which audio signals are reproduced will be considered. Data that is subjected to sampling by the A/D converter 12 during the period t which is between the period time $T_0$ to $t_1$, is again subjected to sampling when it is converted by the D/A converter 14. It is to be assumed that, if the cycle of this sampling is multiplied by 1/k, the data will be turned into signals that are free from any components due to fluctuations in the transporting speed of the magnetic tape 1.

That is, the controller 18 keeps the value of the pulse cycle $T_0$ to be obtained when the tape is transporting at the rated speed, and performs the computation of the value of $T(t)/T_0 =k$ each time the actual pulse cycle $T(t)$ is obtained as the output of the rotary encoder 10b, which is measured during the period t, i.e., $t_0$ to $t_1$. In this way, the cycle fluctuation coefficient k is calculated. The calculated cycle fluctuation coefficient k is supplied to the clock control section 16, which performs, on the basis of the cycle fluctuation coefficient k thus supplied, a calculation to obtain $CK_2=CK_1/k$ with respect to the clock pulses $CK_1$, of a fixed frequency to thereby generate clock pulses $CK_2$. These clock pulses $CK_2$ are supplied as read-out clock pulses for the memory 13 and as sampling clock pulses for the D/A converter 14, whereby it is possible to obtain audio signals free from the influence of wow and flutter as the output audio signals of the D/A converter 14.

This operation will be schematically described with reference to FIGS. 2A to 2D.

Figure 2A:
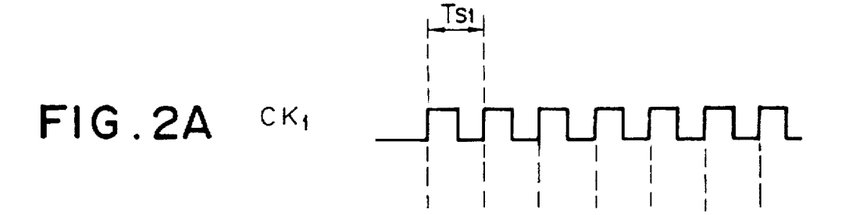
FIGS. 2A to 2D are diagrams illustrating the operation of the first embodiment.
Figure 2B:
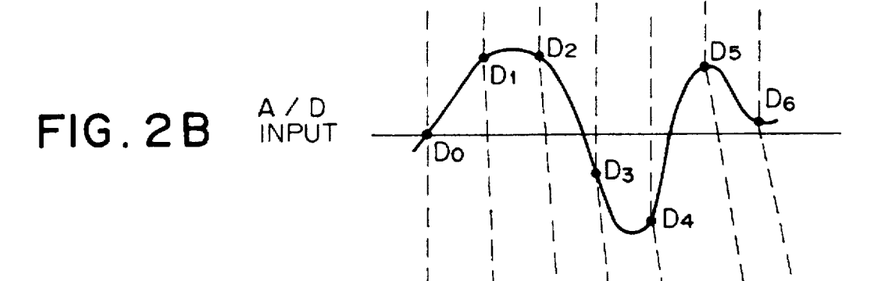
Figure 2C:
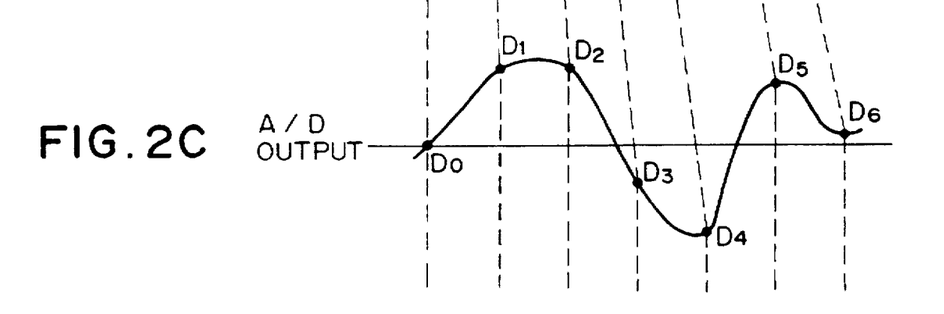

When fixed clock pulses having a cycle $T_{S1}$, as shown in FIG. 2A are used to convert analog audio signals input from the reproducing amplifier 3 into digital sounds pieces of data $D_0, D_1, D_2, D_3, \ldots$ are obtained, as shown in FIG. 2B. These pieces of data $D_0, D_1, D_2, D_3, \ldots$ are stored in the memory 13. Suppose the waveform shown in FIG. 2B is contracted along the time axis as compared to the waveform obtained when the tape is transporting at the rated speed because the transporting speed of the tape is higher than the rated transporting speed. Further, suppose the waveform as shown in FIG. 2C is the one to be obtained when the magnetic tape is transporting at the rated speed.

Figure 2D:
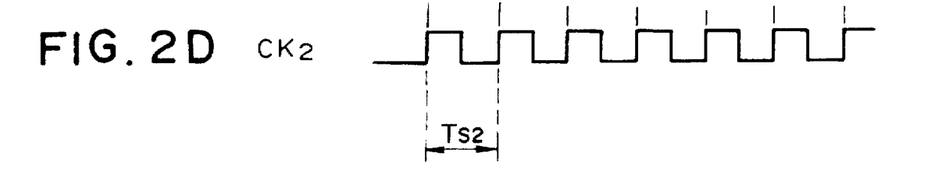

In the clock controller 16, the clock pulses $CK_2$, serving as read clock pulses for the memory 13 and as sampling clock pulses for the D/A converter 14, are set so as to satisfy the equation: $CK_2=CK_1/k$, and have a cycle $T_{S2}$, as shown in FIG. 2D. As stated above, the cycle fluctuation coefficient k is a value calculated from the output of the rotary encoder 10b. The reading-out of data from the memory 13 and the D/A conversion at the D/A converter 14 occur on the basis of the clock pulses $CK_2$, whereby the output signal from the D/A converter 14 is a signal having the correct waveform as shown in FIG. 2C, i.e., an analog audio signal from which wow and flutter components have been eliminated.

Thus, in the first embodiment of the present invention, the input/output timing of the digital signal processing section 11 is controlled in accordance with the output of the rotary encoder 10b, thereby making it possible to compensate for any fluctuation component due to wow and flutter in the signals reproduced from the magnetic tape 1, i.e., the reproduced analog signals.

Figure 3:
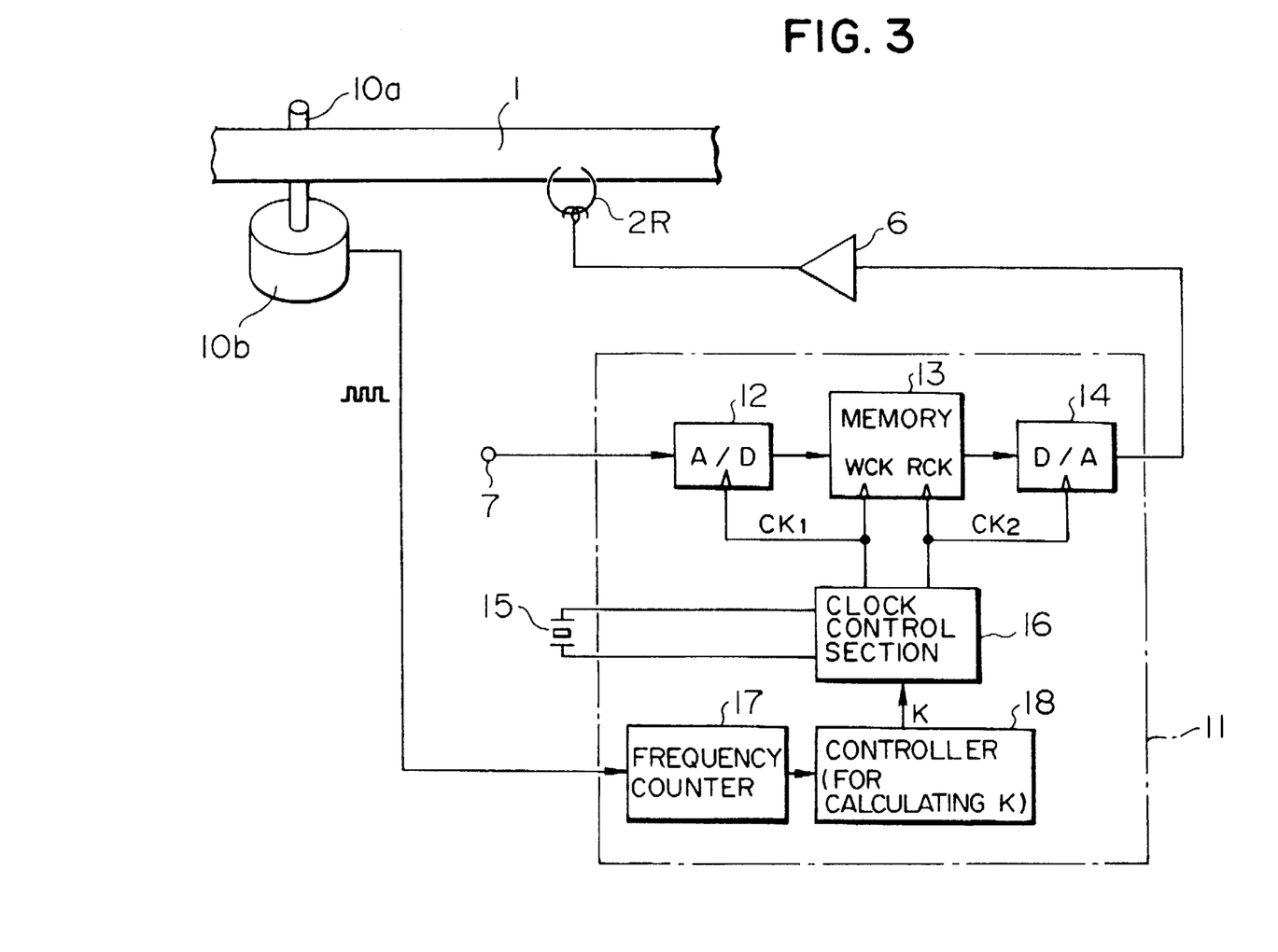
FIG. 3 is a block diagram showing a modification of the first embodiment.

This audio signal processing method is also applicable to a recording circuit. FIG. 3 shows an essential part of a recording circuit to which the above processing is applied.

In FIG. 3, reference 2R indicates a recording head, reference numeral 6 indicates a recording amplifier and reference numeral 7 indicates an analog audio signal input terminal. The other components are formed in the same way as in FIG. 1, so a detailed description of them will be omitted here.

In the circuit shown, analog audio signals to be recorded are input to the digital signal processing section 11 from the input terminal 7, and the output signals from the digital signal processing section 11 are supplied to the recording head 2R through the recording amplifier 6 before they are successively recorded on the magnetic tape 1 by the recording head 2R.

The analog audio signals supplied from the input terminal 7 are naturally free from the influence of fluctuations in the transporting speed of the magnetic tape 1. They are correct signals the waveform of which is neither expanded nor contracted along the time axis. However, if they were directly recorded on the magnetic tape 1, any fluctuation in the transporting speed of the magnetic tape 1 would cause the recorded audio signals to be deformed to exhibit a waveform correspondingly expanded or contracted along the time axis.

In view of this, as in the case of FIG. 1, the input analog audio signals are converted to digital data at the A/D converter 12 by using clock pulses $CK_1$, and the digital data thus obtained is temporarily stored in the memory 13 before it is converted to analog signals at the D/A converter 14 by using clock pulses $CK_2$.

In the above recording system, when the transporting speed of the magnetic tape 1 decreases, the analog audio signals supplied to the recording head 2R will be ones that are expanded along the time axis by an amount of time corresponding to the fluctuation in the transporting speed toward delay. Similarly, when the transporting speed of the magnetic tape 1 increases, the analog audio signals supplied to the recording head 2R will be ones that are compressed along the time axis by an amount of time corresponding to the fluctuation in transporting speed toward advance. Thus, when considered in terms of their positional relationship with the magnetic tape 1, the recorded analog audio signals are neither expanded nor contracted along the time axis in spite of the fluctuation in the transporting speed of the tape 1, and are recorded so as to exhibit the correct waveform. Thus, the above-described processing for reproducing is also applicable to recording, making it possible to effectively eliminate fluctuation components due to wow and flutter.

Figure 4:
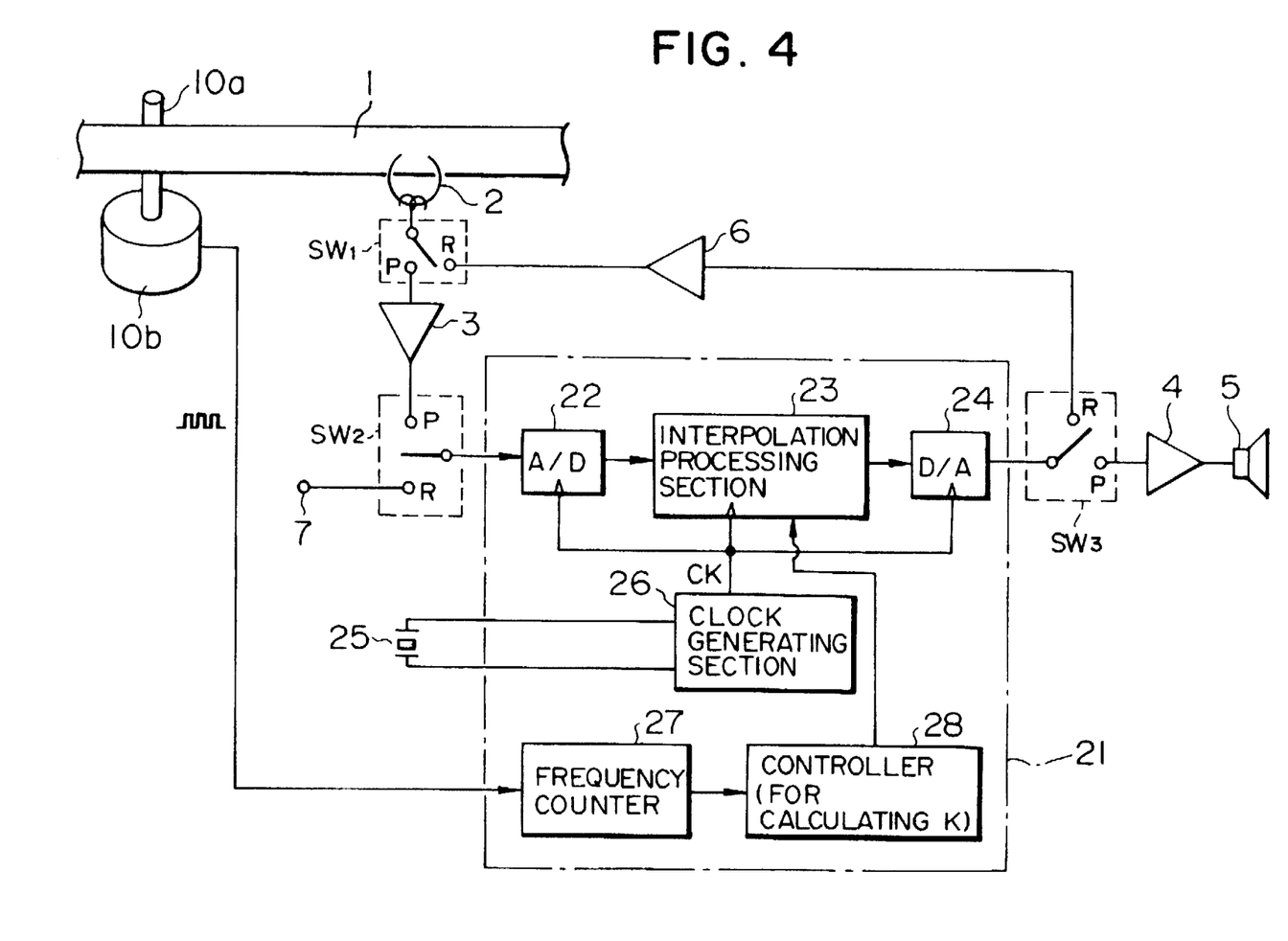
FIG. 4 is a block diagram showing a recording and/or reproducing apparatus according to a second embodiment of the present invention.
Figures 5A, 5B, 5C:
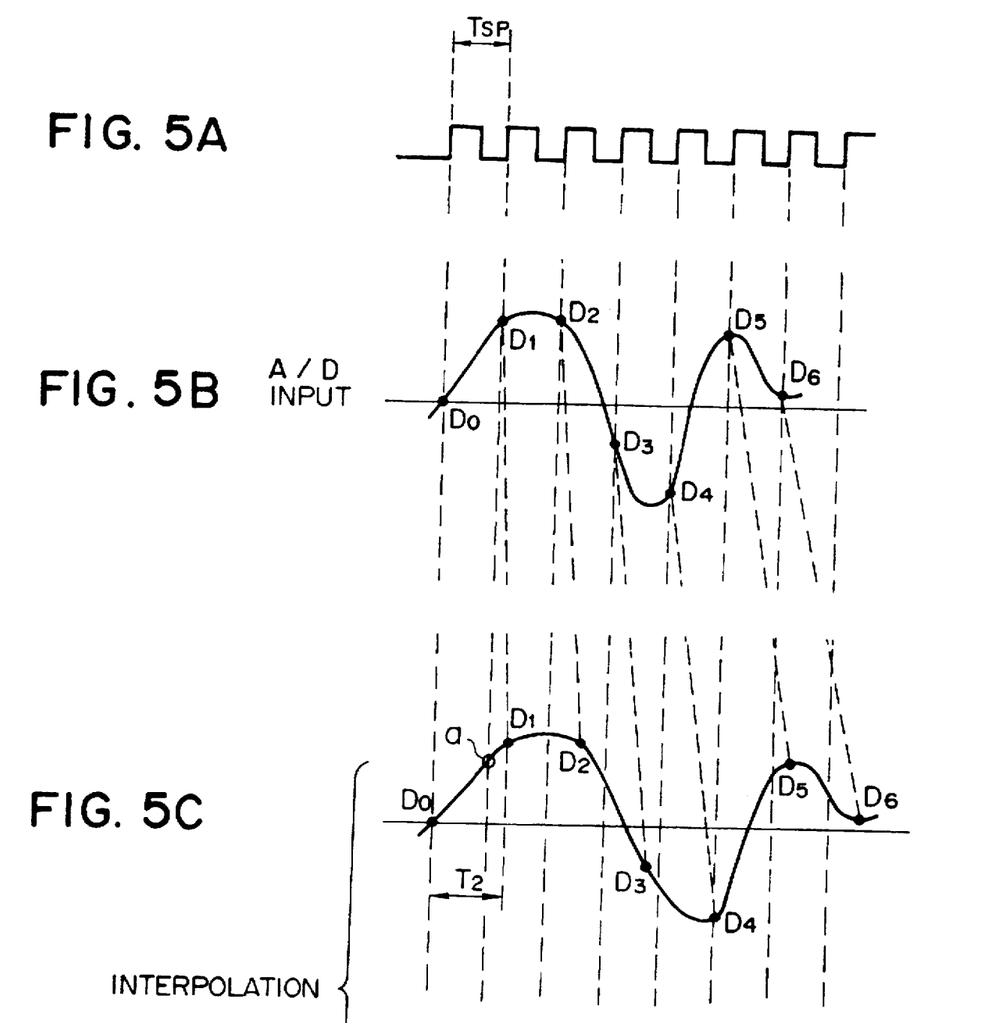
FIGS. 5A to 5D are diagrams illustrating the operation of the second embodiment.
Figure 5D:
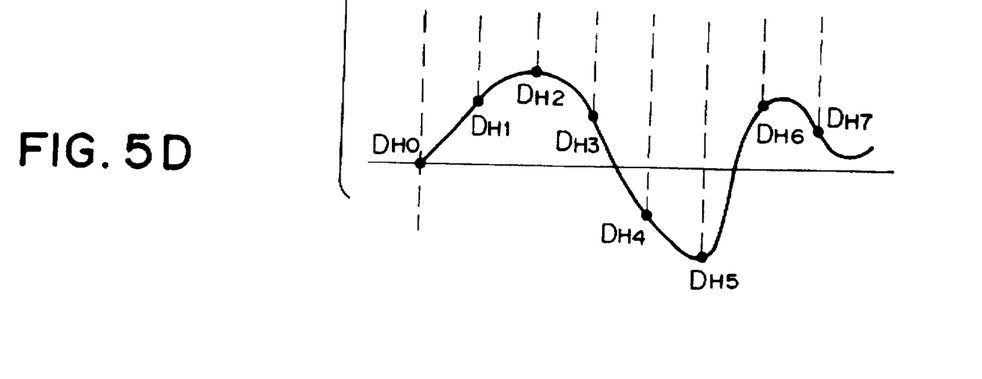

Next, a recording and/or reproducing apparatus for a tape-shaped recording medium according to the second embodiment of the present invention will be described in detail with reference to FIGS. 4 and 5. In FIGS. 4 and 5, the components which are the same as those of FIGS. 1 and 2 are indicated by the same reference numerals, and a detailed description of such components will be omitted here.

In FIG. 4, a reference numeral 2 indicates a recording and reproducing head, and references $SW_1$, $SW_2$, and $SW_3$ indicate changeover switches that are connected to terminal R when recording is to be performed and to terminal P when signals recorded on the magnetic tape 1 are to be reproduced. The switching of the changeover switches $SW_1$, $SW_2$, $SW_3$ between recording and reproducing is effected by a system controller (not shown) of the recording and/or reproducing apparatus. When the switches $SW_1$ to $SW_3$ are connected to terminal P, the reproducing circuit is composed of the signal path which is from the recording and reproducing head 2→the reproducing amplifier 3→the digital signal processing section 21→the power amplifier 4→the speaker unit 5.

When the switches $SW_1$ to $SW_3$ are connected to terminal R, the recording circuit is composed of the signal path which is from the input terminal 7→the digital signal processing section 21 the recording amplifier 6→the recording and reproducing head 2.

Like the first embodiment, the second embodiment described below is applicable not only to a reproducing apparatus but also to a recording apparatus. Here, it will be described as applied to a reproducing apparatus.

The digital signal processing section 21 includes an A/D converter 22, an interpolation processing section 23, and a D/A converter 24. Analog audio signals output from the reproducing amplifier 3 are converted into digital data by the A/D converter 22, and processed by the interpolation processing section 23. The digital data which has undergone interpolation processing by the interpolation processing section 23 (described below) is converted into analog signals by the D/A converter 24, and supplied to the power amplifier 4.

In the second embodiment, the sampling clock pulses supplied to the A/D converter 22 and the sampling clock pulses supplied to the D/A converter 24 are the same ones, which comprised of clock pulses CK from a clock pulse generating section described below.

Reference numeral 25 indicates a clock oscillator, and reference numeral 26 indicates a clock pulse generating section. The clock pulse generating section 26 divides the clock pulses from the clock oscillator 25 and generates clock pulses CK as sampling clock pulses. The clock pulses CK are supplied to the A/D converter 22, the interpolation processing section 23 and D/A converter 24.

Reference numeral 27 indicates a frequency counter for measuring the cycle of the pulses from the rotary encoder 10b, and reference numeral 28 indicates a controller. Like the controller 18 of the first embodiment, the controller 28 computes the cycle fluctuation coefficient k from the measured actual pulse cycle T(t) by using the pulse cycle $T_0$ that would be obtained when the magnetic tape 1 is transporting at the rated speed, and supplies this cycle fluctuation coefficient k to the interpolation processing section 23.

An explanation of the cycle fluctuation coefficient k will be omitted here since it can be obtained in the same manner as in the first embodiment. As in the first embodiment, it is a value indicating a fluctuation in time with respect to a reference cycle.

The operation of the second embodiment will be described with reference to FIGS. 5A to 5D.

When analog audio signals inputted from the reproducing amplifier 3 are digitized at the A/D converter 22 by using clock pulses CK having a cycle Tsp, as shown in FIG. 5A, pieces of data $D_0$, $D_1$, $D_2$, $D_3$, . . . are obtained as shown in FIG. 5B.

These pieces of data are supplied to the interpolation processing section 23. Suppose the waveform shown in FIG. 5B is one relatively contracted along the time axis because of the transporting speed of the magnetic tape 1 being higher than the rated speed. Suppose, at the same time, the waveform of FIG. 5C is the one to be obtained when the transporting speed of the tape is the rated one.

The interpolation processing section 23 generates the waveform of FIG. 5C by using the cycle fluctuation coefficient k, which is supplied from the controller 28. This processing performs multiplication of the data cycle by 1/k.

However, if the pieces of data $D_0$, $D_1$, $D_2$, $D_3$, . . . were directly converted to analog signal by using the clock pulses CK, the waveform of the output analog audio signals would be restored to the one shown in FIG. 5B. In view of this, a data interpolation processing is performed on the waveform of FIG. 5C to thereby generate pieces of data $DH_{H0}$, $DH_{H1}$, $DH_{H2}$, $DH_{H3}$, . . . arranged in the cycle of the clock pulses CK. That is, the interpolation processing section 23 generates, for example, the piece of data $D_{H1}$, which corresponds to point a in FIG. 5C, on the basis of the pieces of data $D_1$ and $D_2$. The pieces of data $D_{H2}$, $D_{H3}$, . . . are generated in the same manner through interpolation processing.

This interpolation processing may consist, for example, in a linear interpolation or a change in sampling frequency through over sampling and under sampling.

In the case of a linear interpolation, it can be effected with respect to the item of data $D_{H2}$, for example, through computation using the pieces of data $D_1$ and $D_2$ and the cycle fluctuation coefficient k.

The pieces of data $D_{H0}$, $D_{H1}$, $D_{H2}$, $D_{H3}$, . . . , generated as shown in FIG. 5D, are subjected to D/A conversion at the D/A converter 24 by using the clock pulses CK, whereby the output signals from the D/A converter 24 are signals having the correct waveform as shown in FIG. 5D, that is, analog audio signals from which wow and flutter components have been eliminated.

Thus, with the second embodiment also, it is possible to eliminate wow components and flutter components from the reproduced signals by appropriately controlling the input/output timing of the digital signal processing section 11 on the basis of the output of the rotary encoder 10b.

Further, also in the case of recording, in which the switches $SW_1$ to $SW_3$ are connected to R-terminal, analog audio signals are so recorded on the magnetic tape 1 that they exhibit the correct waveform with respect to the time axis due to the above-described processing executed by the digital signal processing section 11.

Figure 6:
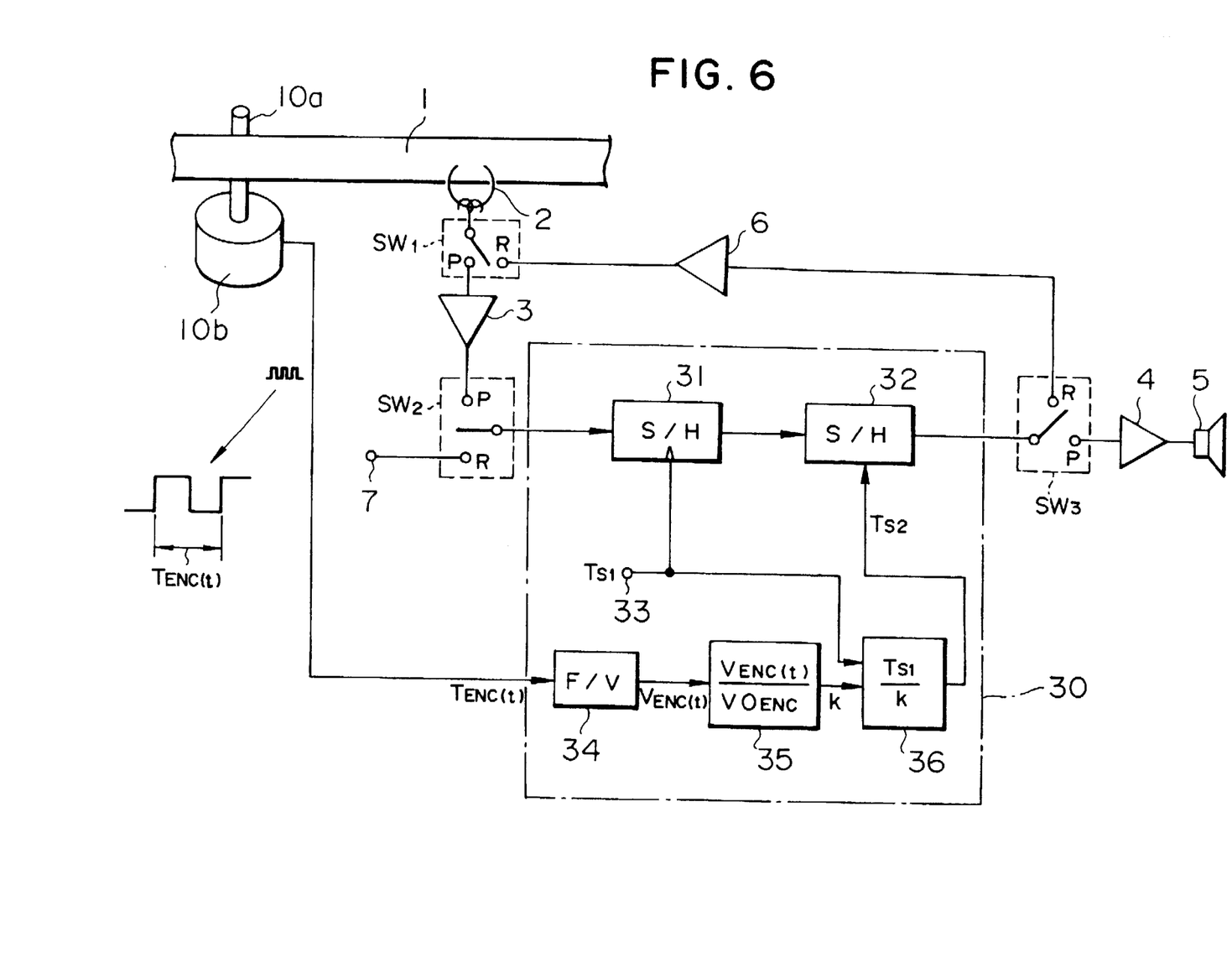
FIG. 6 is a block diagram showing a recording and/or reproducing apparatus according to a third embodiment of the present invention.

Next, the third embodiment of the present invention will be described with reference to FIG. 6. According to the third embodiment, wow components and flutter components are cancelled through analog signal processing. The third embodiment will also be described as applied to a recording and/or reproducing apparatus. In the drawing, the components which are common to the first and second embodiments are indicated by the same reference numerals, and a description of such components will be omitted.

A recording and/or reproducing apparatus according to the third embodiment is formed by the rotary encoder 10b and a signal processing section 30. When the switches $SW_1$ to $SW_3$ are connected to P-terminal, the reproducing circuit is composed of the signal path which is from the recording and reproducing head 2→the reproducing amplifier 3→the signal processing section 30→the power amplifier 4→the speaker unit 5.

When the switches $SW_1$ to $SW_3$ are connected to R-terminal, the recording circuit is composed of the signal path which is from the input terminal 7→the signal processing section 30→the recording amplifier 6→the recording and reproducing head 2.

The signal processing section 30 includes sample-and-hold circuits 31 and 32. In the reproducing operation, in which the switches $SW_1$ to $SW_3$ are connected to P-terminal, analog audio signals output from the reproducing amplifier 3 are supplied to the power amplifier 4 through the sample-and-hold circuits 31 and 32.

The sample-and-hold circuit 31 is supplied with a fixed sampling cycle signal $T_{S1}$, from a terminal 33.

Reference numeral 34 indicates a frequency/voltage converting section, and reference numerals 35 and 36 indicate dividers.

The frequency/voltage converting section 34 converts a pulse cycle $T_{ENC}$ from the rotary encoder 10b into a voltage value $V_{ENC(t)}$.

The divider 35 obtains through division by a fixed value $V0_{ENC}$ from the voltage value $V_{ENC(t)}$ supplied from the frequency/voltage converting section 34 a value k.

Suppose the cycle of the output pulses to be obtained from the rotary encoder 10b when the magnetic tape 1 is transporting at a rated speed in a period of time t, which is between predetermined points in time to $t_0$ to $t_1$, is $T0_{ENC}$. The above pulse cycle $T_{ENC(t)}$ is the output of the rotary encoder 10b which is actually measured in the period t, i.e., $t_0$ to $t_1$, during the transportation of the magnetic tape 1.

Suppose the voltage value when the pulse cycle $T_{ENC(t)}$ =$T0_{ENC}$ is $V0_{ENC}$. That is, the fixed value $V0_{ENC}$ used in the division by the divider 35 is the value obtained when the magnetic tape 1 is transporting at the rated speed.

The value of k, which is to be obtained through the calculation by the divider 35: $V_{ENC(t)}/V0_{ENC}$=k, is the value of $T_{ENC(t)}/T0_{ENC}$. That is, k is a value indicating a fluctuation in time with respect to a reference cycle when there is a fluctuation in the transporting speed of the magnetic tape 1. Thus, in the third embodiment, the cycle fluctuation constant k is calculated by the divider 35.

Here, the reproduction of analog audio signals in this system will be considered. Signals which have undergone sampling at the sample-and-hold circuit 31 during the period of time t, i.e. $t_0$ to $t_1$, are output through the sample-and-hold circuit 32, where multiplication by 1/k times is effected on the output from the sample-and-hold circuit 31, with the result that reproduced signals are free from fluctuation components due to the fluctuation in the tape transporting speed.

The cycle fluctuation coefficient k, calculated by the divider 35, is supplied to the divider 36. The divider 36 is also supplied with a sampling cycle signal $T_{S1}$ from the terminal 33. This divider 36, in which the division $(T_{S1}/k) = T_{S2}$ is executed, generates a sampling cycle signal $T_{S2}$ for the sample-and-hold circuit 32.

Thus, in the third embodiment, the holding time $T_{S2}$ of the sample-and-hold circuit 32, as compared to the holding time $T_{S1}$ of the sample-and-hold circuit 31, is given as: $T_{S2}=(T_{s1}/k)$, thereby making it possible to eliminate wow and flutter from the reproduced signals.

What has been described above also applies to a recording operation, in which the switches $SW_1$ to $SW_3$ are connected to R-terminal. That is, due to the signal processing operation of the signal processing section 307 analog audio signals having a proper waveform with respect to t he time axis can be recorded on the magnetic tape 1.

Apart from this, the third embodiment is advantageous in that it can be employed in an apparatus in which no digital circuit section is incorporated.

It goes without saying that the present invention is not restricted to the above-described embodiments but allows various modifications without departing from the scope of the present invention. For example, while in the above-described embodiments the speed detector for detecting the transporting speed of the magnetic tape is formed by a roller adapted to rotate with the transporting of the magnetic tape and a rotary encoder for detecting the rotation of the roller, this should not be construed restrictively. Instead of using a detector specifically designed to detect the transporting speed of the magnetic tape, it is also possible to provide a rotation detector for detecting the rotation of the capstan shaft for transporting the magnetic tape. In that case, information on the transporting speed of the magnetic tape can be obtained on the basis of a signal output from this rotation detector. Further, it is also possible to use, instead of a speed detector of the above-described type, which uses a roller held in direct contact with the magnetic tape, a non-contact-type speed detector, such as a laser doppler device may be used.

What is claimed is:

1. A recording and/or reproducing apparatus for a tape-shaped recording medium, the apparatus comprising:
   a recording and/or reproducing head for recording and/or reproducing analog signals on and/or from the tape-shaped recording medium;
   detecting means for detecting a variation in a transport speed of the tape-shaped recording medium relative to a rated transport speed and generating a cycle fluctuation coefficient; and
   compensating means connected to the detecting means and the recording and/or reproducing head for modifying the analog signals read out from or to be recorded on the tape-shaped recording medium by the head based on the cycle fluctuation coefficient from the detecting means so as to compensate for the variation in the transport speed of the tape-shaped recording medium relative to the rated transport speed and outputting compensated analog signals or supplying the compensated analog signals to the head,
   wherein the compensating means comprises:
   clock pulse generating means;
   A/D conversion means connected to the recording and/or reproducing head and the clock pulse generating means for converting the analog signals read from or to be recorded on the tape-shaped recording medium by the head into digital data in response to clock pulses from the clock pulse generating means; and
   signal converting means connected to the A/D conversion means and the detecting means for converting the digital data from the A/D conversion means to the compensated analog signals based on the cycle fluctuation coefficient so as to compensate for the variation in the transport speed of the tape-shaped recording medium relative to the rated transport speed, and
   wherein the signal converting means comprises:
   interpolation means connected to the A/D conversion means and the detecting means for performing interpolation processing on the digital data from the A/D conversion means and outputting interpolated digital signals based on the cycle fluctuation coefficient, whereby the interpolated digital signals represent a digital signal that would be obtained if the tape-shaped recording medium was transported at the rated transport speed; and
   D/A conversion means connected to the interpolation means for converting the interpolated digital signals from the interpolation means into the compensated analog signals.

2. A recording and/or reproducing apparatus according to claim 1, wherein the detecting means comprises
   speed detecting means for detecting the transport speed of the tape-shaped recording medium, and
   computation means for computing a ratio of the detected transport speed of the tape-shaped recording medium to the rated transport speed.

3. A recording and/or reproducing apparatus according to claim 2, wherein the speed detecting means comprises
   a rotary operating section in frictional contact with the tape-shaped recording medium and rotated by the tape-shaped recording medium, and
   pulse generating means connected to the rotary operating section for generating pulses having a cycle which varies in accordance with rotation of said rotary operating section by said tape-shaped recording medium.

4. A recording and/or reproducing apparatus according to claim 1, wherein the clock pulse generating means generates first clock pulses supplied to the A/D conversion means and second clock pulses supplied to the D/A conversion means, the second clock pulses having the same frequency and phase as the first clock pulses.

5. An audio signal processing apparatus comprising:
   input means;
   clock pulse generating means;
   tape speed detecting means;
   A/D conversion means connected to the input means and the clock pulse generating means for converting analog signals input by the input means based on clock pulses from the clock pulse generating means into digital signals;

computation means connected to the A/D conversion means and the tape speed detecting means for computing a fluctuation in a transport speed of a tape-shaped recording medium relative to a rated transport speed based on the detected transport speed of the tape-shaped recording medium detected by the tape speed detecting means and for computing a ratio of the detected transport speed of the tape-shaped recording medium detected by the tape speed detecting means to the rated transport speed; and signal converting means connected to the computation means for converting the digital signals from the A/D conversion means to compensated analog signals such that the fluctuation in the transport speed relative to the rated transport speed is compensated for based on computation results from the computation means, the signal converting means outputting the compensated analog signals wherein the signal converting means comprises:

interpolation means for performing interpolation on the digital signals from the A/D conversion means based on the ratio from the computation means and outputting interpolated digital signals, the ratio being equal to 1 when the detected transport speed and the rated transport speed are the same; and D/A conversion means for converting the interpolated digital signals from the interpolation means into the compensated analog signals.

6. An audio signal processing apparatus according to claim 5, wherein said signal converting means comprises D/A conversion means for converting the digital signals from said A/D conversion means, and wherein said clock pulse generating means generates first clock pulses to be supplied to said A/D conversion means and second clock pulses which vary from the first pulses in accordance with the ratio as output from said computation means to be supplied to said D/A conversion means.

7. A recording and/or reproducing apparatus for a tape-shaped recording medium according to claim 1, wherein the interpolation means performs linear interpolation.

* * * * *